United States Patent
Eckert et al.

(10) Patent No.: US 8,281,667 B2
(45) Date of Patent: *Oct. 9, 2012

(54) METHOD FOR DETERMINING THE MASS FLOW THROUGH A CORIOLIS MASS FLOWMETER ARRANGED ON A ROTATING FILLING ELEMENT

(75) Inventors: Gerhard Eckert, Rheinfelden (DE); Christian Matt, Aesch (CH); Matthias Altendorf, Lörrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 703 days.

This patent is subject to a terminal disclaimer.

(21) Appl. No.: 12/310,891

(22) PCT Filed: Aug. 31, 2007

(86) PCT No.: PCT/EP2007/059139
§ 371 (c)(1),
(2), (4) Date: Jul. 28, 2009

(87) PCT Pub. No.: WO2008/034710
PCT Pub. Date: Mar. 27, 2008

(65) Prior Publication Data
US 2011/0179881 A1     Jul. 28, 2011

(30) Foreign Application Priority Data
Sep. 19, 2006 (DE) .......................... 10 2006 044 592

(51) Int. Cl.
*G01F 1/84* (2006.01)
(52) U.S. Cl. ................................................. 73/861.354
(58) Field of Classification Search .......... 73/861.355–861.357; 137/1; 141/83
See application file for complete search history.

(56) References Cited

U.S. PATENT DOCUMENTS

| | | | | |
|---|---|---|---|---|
| 5,996,650 | A * | 12/1999 | Phallen et al. ................... | 141/83 |
| 6,457,372 | B1 * | 10/2002 | Laursen et al. .......... | 73/861.356 |
| 7,856,891 | B2 * | 12/2010 | Kirst et al. ............... | 73/861.355 |
| 7,896,017 | B2 * | 3/2011 | Malcolm ........................... | 137/1 |

FOREIGN PATENT DOCUMENTS

| | | |
|---|---|---|
| DE | 102 55 743 A1 | 6/2004 |
| EP | 0 414 031 A1 | 2/1991 |
| EP | 0 534 876 A1 | 3/1993 |
| EP | 0 893 396 A1 | 1/1999 |
| FR | 2 750 689 A1 | 1/1998 |
| WO | WO 2004/049641 A2 | 6/2004 |
| WO | WO 2005/031285 A1 | 4/2005 |
| WO | WO 2006/036139 A1 | 4/2006 |

* cited by examiner

*Primary Examiner* — Jewel V Thompson
(74) *Attorney, Agent, or Firm* — Bacon & Thomas, PLLC

(57) ABSTRACT

In a method for determining mass flow with a Coriolis mass flow measuring device arranged on a rotary filler, a correction value $\Delta\dot{m}$ is ascertained, which is proportional to the RPM n of the rotary filler. This correction value is subtracted from the conventionally ascertained value $\dot{m}$ of the mass flow. The corrected measured value $\dot{m}_{corr}$ is thus $\dot{m}_{corr} = \dot{m} - \Delta\dot{m}$.

3 Claims, 2 Drawing Sheets

1

METHOD FOR DETERMINING THE MASS FLOW THROUGH A CORIOLIS MASS FLOWMETER ARRANGED ON A ROTATING FILLING ELEMENT

TECHNICAL FIELD

The invention relates to a method for determining mass flow with a Coriolis mass flow measuring device arranged on a rotary filler.

BACKGROUND DISCUSSION

Coriolis mass flow measuring devices are frequently applied for filling liquids, especially solvents, dyes, cleaning agents or pharmaceutical products into containers, such as bottles. These mass flow meters enable a very exact metering of the liquid to be filled. An example of such a mass flow meter is the PROMASS 83T15 meter of the firm, Endress+Hauser.

Industrially used for the filling of liquids are, besides line fillers, also so-called rotary fillers. Rotary fillers are sometimes also referred to as carousel, filling machines. Rotary fillers, in general, are described in EP 893 396 B1 and EP 414 031 A1. Such filling machines enable a bottle throughput of typically up to 20,000 per hour. In such case, the bottles to be filled are continuously supplied, via an appropriate delivery system, to the rotary filler. The actual filling procedure occurs during the period of time in which the bottles are located on the rotary filler. Following the filling, the bottles leave the rotary filler and are automatically conveyed further.

It has been found that the accuracy of measurement of Coriolis mass flow meters, when used in rotary fillers, is not always sufficient to assure exact metering.

SUMMARY OF THE INVENTION

An object of the invention, therefore, is to provide a method for determining mass flow in the case of rotary fillers employing a Coriolis mass flow measuring device, which method enables an exact determining of mass flow, in order to assure exact metering.

This object is achieved by the method of: conventionally determining mass flow $\dot{m}$ with the Coriolis mass flow measuring device; ascertaining RPM n of the rotary filler; calculating a correction value $\Delta\dot{m}=k*n$, with a constant k; and determining corrected mass flow $\dot{m}_{corr}$, with $\dot{m}_{corr}=\dot{m}-\Delta\dot{m}$.

An essential idea of the invention is to correct the measured value ascertained for mass flow by a Coriolis mass flow measuring device with a corrective value, which is proportional to the rotational speed, or RPM (revolutions per minute), of the rotary filler.

In a further development of the method of the invention, correction is performed directly in the Coriolis mass flow measuring device. The RPM of the rotary filler is, in this case, sent to the Coriolis mass flow measuring device.

DETAILED DISCUSSION IN CONJUNCTION WITH THE DRAWINGS

Figure 1:
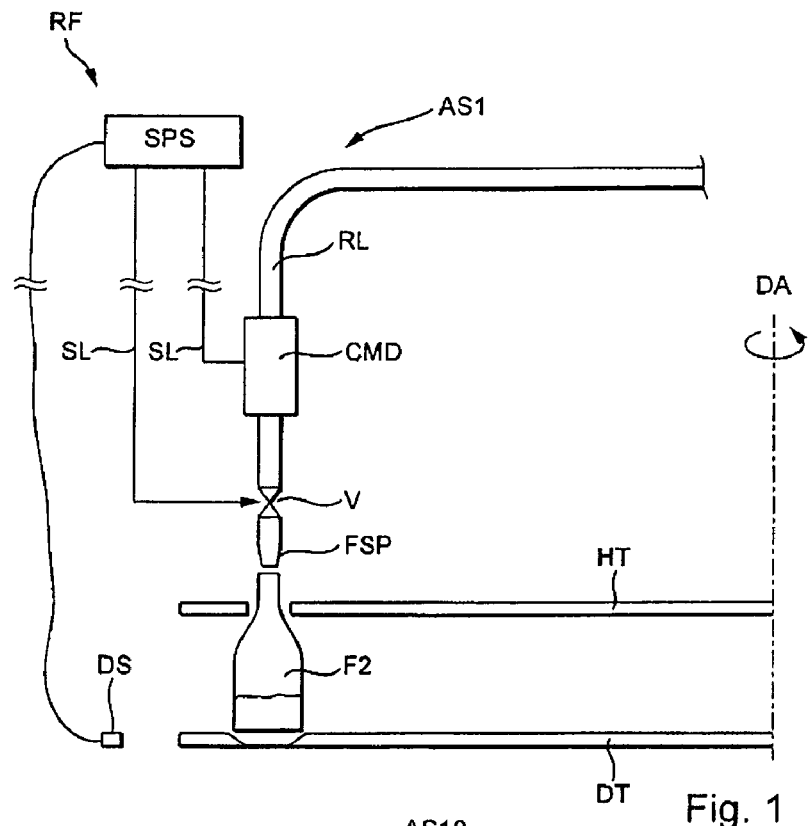
FIG. 1 a schematic view a filling location of a rotary filler.
Figure 2:
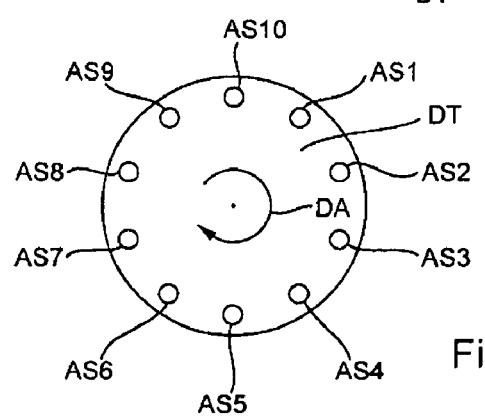
FIG. 2 a schematic, plan view of a turntable of a rotary filler of FIG. 1.

FIG. 1 shows, schematically, a filling location FL1 of a rotary filler RF. As shown in FIG. 2, the rotary filler RF includes a total of 10 filling locations FL1-FL10. Each filling location of the rotary filler RF is identically constructed. Filling location FL1 includes, as shown in FIG. 1, a Coriolis mass flow measuring device CMD, a valve V and a filling tip FTP, which are connected via a pipeline PL. Beneath the filling tip FTP is located a bottle B, which is in the process of being filled. The liquid level in the bottle B is indicated by a wavy line.

The bottle B is guided during the filling on a turntable TT; the bottle neck is fixed by a supplemental holder HR. The liquid is fed via the pipeline PL from a filling container (not shown). The metering procedure is controlled with the assistance of a programmable logic controller PLC. For this, the PLC is connected with the Coriolis mass flow measuring device CMD and the valve V via corresponding signal lines SL. The controller PLC can be arranged both on the rotary filler RF as well as also outside of the rotary filler RF. The signal lines from the controller to the other filling locations are not shown, in order to avoid clutter. Data transmission on the signal line can be in analog or digital form. The PLC controls the filling procedure at the filling location FL1 by opening and closing the valve V. The amount of liquid being filled is ascertained with the assistance of the Coriolis mass flow measuring device CMD. The controller PLC is also connected with a rotational speed sensor RS, which is arranged at the edge of the turntable TT for registering the RPM of the rotary filler RF. The rotational axis RA, about which the rotary filler RF rotates, is shown by the dot-dashed line in FIG. 1. It extends parallel to the longitudinal axis of the Coriolis mass flow measuring device CMD.

FIG. 2 shows a plan view of the turntable TT of the rotary filler with the 10 filling locations FL1-FL10.

The method of the invention will now be explained in greater detail.

In a first method step a), the mass flow $\dot{m}$ is ascertained in conventional manner with the assistance of the Coriolis mass flow measuring device CMD. In a second method step b), the RPM n of the rotary filler RF is ascertained. Then, in the method step c), a correction value $\Delta\dot{m}$ is calculated, wherein $\Delta\dot{m}=k*n$. The correction value $\Delta\dot{m}$ is, thus, proportional to the RPM n, with a proportionality constant k. In a last method step d), the corrected mass flow $\dot{m}_{corr}$ is ascertained, wherein $\dot{m}_{corr}=\dot{m}-\Delta\dot{m}$.

In the case of the method of the invention, the measured value $\dot{m}$ measured in conventional manner is corrected with a correction value $\Delta\dot{m}$, which is proportional to the RPM n of the rotary filler. With growing RPM n, the influence of the correction value $\Delta\dot{m}$ becomes ever greater.

The constant k can be ascertained at start-up of the rotary filler RF. For this, the shift of the measurement zero point as a function of the RPM n is ascertained for the case of closed valve. A concrete value for zero point shift in the case of 10 revolutions of the turntable TT per minute is e.g. 3.4 kg/h, which results in a value of 0.34 kg/h/1/min for the constant k.

By taking into consideration the correction value $\Delta\dot{m}$ in the determining of mass flow, the filling accuracy is significantly improved for rotary fillers. The correction can also occur directly in the Coriolis mass flow measuring device CMD. For this, the RPM n must be sent to the Coriolis mass flow measuring device CMD.

For an improved accuracy of measurement, the one or more measuring tubes of the Coriolis mass flow measuring device CMD are arranged parallel to the rotational axis RA of the rotary filler RF.

Figure 3:
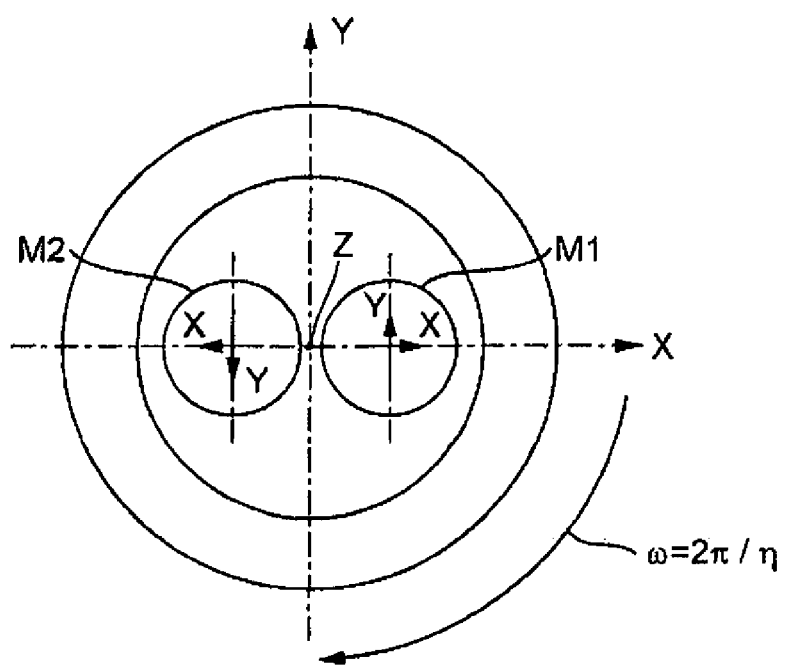
FIG. 3 a schematic drawing of the oscillatory movements of a Coriolis mass flow measuring device having two measuring tubes, wherein the Coriolis mass flow measuring device is installed on a rotary filler, which is rotating.

Investigations have shown that the error, which is made in the case of a conventional determining of mass flow, is probably attributable to the fact that the sensors, which serve for registering the oscillatory movement of the one or more measuring tubes, register an additional oscillatory movement caused by the rotation of the rotary filler. This explanation can be detailed briefly on the basis of FIG. 3. There, the oscillatory movement of two measuring tubes M1 and M2 of a Coriolis mass flow measuring device CMD are presented schematically. The housing wall of the device is indicated by the two outer circles. In the case of a resting rotary filler, the two measuring tubes of the Coriolis mass flow measuring device move oppositely in the X direction.

On a rotating, rotary filler, the Coriolis mass flow measuring device executes a rotation around the longitudinal axis of the rotary filler, wherein the longitudinal axis of the rotary filler lies in the Z direction. In such case, Coriolis forces cause the measuring tubes M1, M2 to be deflected also in the Y direction. The deflections are indicated with the small arrows X and Y. The larger the RPM n is, the more the deflection of the two measuring tubes M1, M2 in the Y direction increases.

In particular circumstances, the amplitudes in the X and Y directions can even be of equal size. The oscillatory movement of the two measuring tubes M1 and M2 is registered with two sensors (not shown). These measure, however, not only the oscillatory movement in the X direction, but also, to a slight extent, the oscillatory movement in the Y direction caused by the rotary movement. The sensitivity of the sensors to the movement in the Y direction can be up to 5% of the movement in the X direction.

Due to the influence of the oscillatory movement in the Y direction, there results, therefore, in the case of a rotation of the rotary filler, an error in the determining of mass flow $\dot{m}$. This error is corrected by the method of the invention. In this way, an exact metering can be assured, in every individual filling procedure.

The invention claimed is:

1. A method for determining mass flow with a Coriolis mass flow measuring device arranged on a rotary filler, comprising the steps of:
conventionally determining mass flow $\dot{m}$ with the Coriolis mass flow measuring device;
ascertaining RPM n of the rotary filler;
calculating a correction value $\Delta\dot{m}=k*n$, with a constant k; and
determining corrected mass flow $\dot{m}_{corr}$ with $\dot{m}_{corr}=\dot{m}-\dot{m}$.

2. The method as claimed in claim 1, wherein:
the RPM n of the rotary filler is sent to the Coriolis mass flow measuring device and correction of the mass flow occurs in the Coriolis mass flow measuring device.

3. The method as claimed in claim 1, wherein:
the rotary filler defines a rotational axis;
the Coriolis mass flow measuring device has at least one measuring tube; and
the at least one measuring tube of the Coriolis mass flow measuring device is arranged parallel to the rotational axis of the rotary filler.

* * * * *